(No Model.)

C. LYNCH.
VALVE.

No. 392,961. Patented Nov. 13, 1888.

Witnesses:
James F. D'Hamel
Horace A. Dodge

Inventor:
Charles Lynch,
by Dodge Sons,
Attys.

UNITED STATES PATENT OFFICE.

CHARLES LYNCH, OF DETROIT, MICHIGAN, ASSIGNOR TO JAMES GALVIN, OF SAME PLACE.

VALVE.

SPECIFICATION forming part of Letters Patent No. 392,961, dated November 13, 1888.

Application filed April 17, 1888. Serial No. 270,929. (No model.)

*To all whom it may concern:*

Be it known that I, CHARLES LYNCH, of Detroit, in the county of Wayne and State of Michigan, have invented certain new and useful Improvements in Valves, of which the following is a specification.

My invention consists in an improvement upon the valve for which Letters Patent were issued to T. Galvin and J. Galvin, bearing date the 21st day of August, 1883, and numbered 283,479, the improvement consisting in a novel form or construction of the wedges, whereby they are prevented from falling down by gravity and forcing the valve-disks facewise either against their seats before said disks are carried entirely across the gateway of the valve—a difficulty encountered with the former valve when placed with its axis and that of the stem in a horizontal plane.

Figure 1:
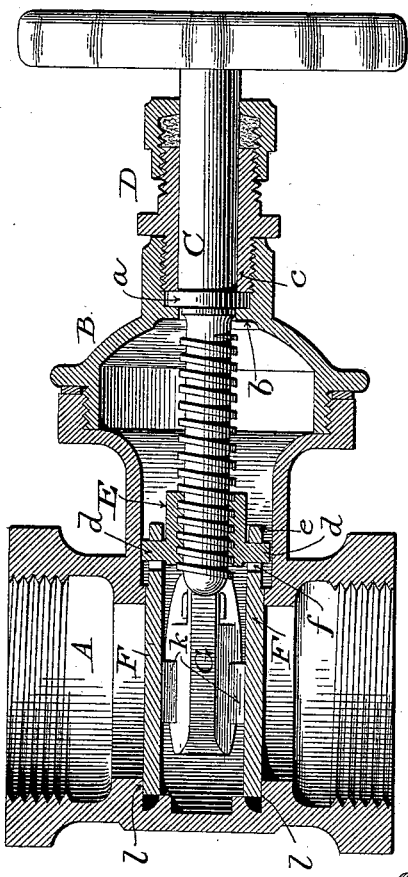
Figure 2:
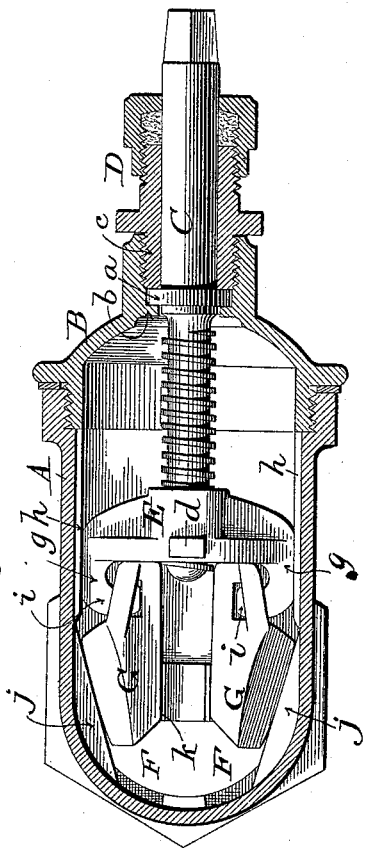
Figure 4:
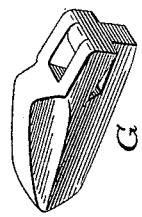
Figure 3:
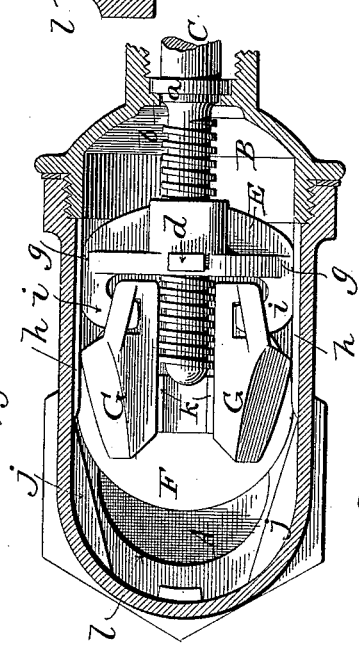
Figure 5:
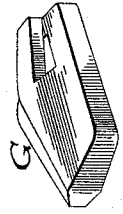

In the accompanying drawings, Figure 1 is a longitudinal sectional view of a valve embodying my improvement; Figs. 2 and 3, transverse sections of the same, the former showing the valve closed and the latter showing it partly open; and Figs. 4 and 5, perspective views of one of the wedges.

In all particulars, except the form and proportion of the wedges, the valve may be of the same construction as set forth in the patent above referred to; but instead of making the wedges as shown in said patent their inner face is filled out and made straight to form bearing-surfaces to rest upon the inner end of the screw-stem and prevent the wedges approaching each other, except when the nut or yoke passes sufficiently far down upon the screw to carry the wedges clear of its end, which will occur only at the time the valve-disks begin to bear upon the stops which arrest their motion.

Referring again to the drawings, A indicates the shell or case of the valve, of usual form, provided with a removable cap, B, and screw-stem C, for raising or lowering the gates or disks, and a packing-gland or stuffing-box, D, applied to the cap B and encircling the screw-stem to prevent leakage, as in the former valve.

E indicates a nut or yoke through which the screw-stem C passes, said stem being provided with a collar, $a$, which, working between a flange or shoulder, $b$, in the cap B and the end of the thimble or sleeve $c$, prevents longitudinal movement of the screw-stem. Upon turning the stem C the nut or yoke E will be moved forward or backward upon the stem to carry with it the disks F, which are arranged with ears $e$, having eyes or openings $f$ to receive lugs $d$, projecting from the sides of the nut or yoke E.

The nut or yoke E is formed with arms $g$ at right angles to the lugs $d$, the outer ends of which arms are arranged to work between guiding-ribs $h$, formed in the body of the shell A at each side of the water-way, said arms $g$ being turned inward to form hooks or hangers $i$, upon which are mounted the wedges G, which are forced inward toward each other by coming in contact with beveled or inclined bearing-surfaces $j$, formed in the outer shell or case below the guiding-rib $h$, the wedges G being formed with sockets or recesses to receive the hooks or hangers $i$, as shown in Figs. 2, 3, 4, and 5.

The wedges G are arranged between the disks F, which disks are formed with inclines $k$ on their inner faces, against which the wedges bear for the purpose of forcing the disks apart.

It will thus be seen that, with the parts constructed and arranged as explained, if the screw-stem be turned in the proper direction to cause the forward or inward movement of the nut or yoke E, with its disks F and wedges G coming in contact with the inclines $k$, and being thereby forced inward toward each other against the inclined faces $j$ and $k$ of the disks F, it will force said disks apart, causing them to be firmly pressed against the bearing-faces $l$ on the valve-face. It will also be seen, however, that if the valve be placed in the position indicated in Figs. 2 and 3 the uppermost wedge G will tend to fall by gravity between the two disks and to force them apart, whether they be carried across the water-way or not, and as the disks are usually faced with rubber, leather, or other light packing material which will not gradually slide upon the valve-seat there is the liability of forcing the disks firmly against the bearing-faces of the seats before the disks entirely cover or close the water-way—a difficulty most frequently met with in large valves, in which the wedges are of very considerable weight. To remedy this difficulty, I construct the wedges G in the form shown in Figs. 4 and 5—that is to say, their inner faces are made to extend inward to such distance that when in position upon the hooks or arms *i* their inner faces shall be in line with the exterior face of the screw-thread of stem C, as best shown in Fig. 3.

From this construction it follows that so long as the screw-stem is inserted to any extent whatever between the opposing faces of the wedges G it will prevent the approach of the wedges G toward each other, and will consequently prevent their acting upon and crowding apart the disks F, and this whether the valve be placed in a horizontal position or otherwise. A similar result may of course be effected by providing the end of the stem of screw C with a block of such width as to hold the wedges apart; but this I consider merely the inferior equivalent of the plan above described, and shown in the drawings.

Upon referring to Fig. 2 it will be seen that the inner end of the screw-stem passes from between the wedges just before the closing of the valve is completed, so that the last few turns or partial turn of the stem gives the necessary movement to force the wedges inward and crowd the disks apart after the wedges have moved off or out of contact with the stem.

The manner in which the wedges are prevented from approaching each other or prematurely acting upon the disks will be readily understood upon referring to Fig. 3.

All parts of the valve not herein specifically described may be of the construction shown in the patent above referred to, or of any other approved or usual construction, the present invention being confined to the means for preventing the premature approach of the wedges toward each other.

Having thus described my invention, what I claim is—

1. In combination with a shell or casing, a screw-stem swiveled therein, a nut or yoke threaded to receive said stem, disks carried by said yoke, and wedges also carried by said yoke and located between the disks, said wedges having their inner or opposing faces extended inward to bear against the sides of the screw-stem, whereby the wedges are prevented from approaching each other and consequently from forcing the disks to their seats until the screw-stem is withdrawn from between them.

2. In a valve such as shown, the combination of a casing provided with a water-way, disks to closes aid water-way, wedges located between the disks and adapted to force the latter to their seats, bearing-faces for the wedges, and a stem of a diameter corresponding to the distance between the inner faces of the wedges when the latter are separated, said stem being arranged to enter between the wedges as the valve is opened, and to withdraw from between them as the disks reach their seats, whereby the wedges are prevented from acting upon the disks before the latter reach their seats.

In witness whereof I have hereunto set my hand in the presence of two witnesses.

CHARLES LYNCH.

Witnesses:
EDWARD A. DORAN,
WILLIAM S. SHEERAN.